(12) United States Patent
Nakahara

(10) Patent No.: US 9,031,696 B2
(45) Date of Patent: May 12, 2015

(54) ROBOT SYSTEM AND PROCESSED OBJECT MANUFACTURING METHOD

(75) Inventor: Yoshimitsu Nakahara, Fukuoka (JP)

(73) Assignee: Kabushiki Kaisha Yaskawa Denki, Kitakyushu-Shi (JP)

( * ) Notice: Subject to any disclaimer, the term of this patent is extended or adjusted under 35 U.S.C. 154(b) by 588 days.

(21) Appl. No.: 13/397,682

(22) Filed: Feb. 16, 2012

(65) Prior Publication Data
US 2012/0265345 A1  Oct. 18, 2012

(30) Foreign Application Priority Data
Apr. 15, 2011 (JP) .................................. 2011-091398

(51) Int. Cl.
*G05B 15/00* (2006.01)
*B25J 9/16* (2006.01)

(52) U.S. Cl.
CPC ..... *B25J 9/1697* (2013.01); *G05B 2219/40583* (2013.01); *G05B 2219/40607* (2013.01)

(58) Field of Classification Search
USPC .................................. 700/250, 252, 254, 259
See application file for complete search history.

(56) References Cited

U.S. PATENT DOCUMENTS

| | | | |
|---|---|---|---|
| 6,329,387 B2 * | 12/2001 | Verner ........................... | 514/301 |
| 6,804,585 B2 * | 10/2004 | Humbard et al. ................ | 701/3 |
| 7,782,451 B2 | 8/2010 | Matsumoto et al. | |
| 7,874,521 B2 * | 1/2011 | Shuster ......................... | 244/175 |
| 8,027,758 B2 * | 9/2011 | Ferro et al. ...................... | 701/18 |
| 8,032,267 B1 * | 10/2011 | Simon ............................... | 701/4 |
| 8,035,547 B1 * | 10/2011 | Flanigan et al. ................. | 342/36 |
| 8,140,260 B2 * | 3/2012 | Feyereisen et al. ........... | 701/436 |
| 8,457,889 B2 * | 6/2013 | Feyereisen et al. ........... | 701/467 |
| 2004/0080294 A1 * | 4/2004 | Nihei et al. ............... | 318/568.16 |
| 2004/0266276 A1 | 12/2004 | Hariki et al. | |
| 2010/0274391 A1 * | 10/2010 | Dai ................................ | 700/259 |
| 2012/0265345 A1 * | 10/2012 | Nakahara ....................... | 700/259 |
| 2014/0114459 A1 * | 4/2014 | Nakahara ....................... | 700/112 |

FOREIGN PATENT DOCUMENTS

| | | |
|---|---|---|
| CN | 101034070 | 9/2007 |
| JP | 60-146697 | 8/1985 |
| JP | 03-161223 | 7/1991 |
| JP | 2005-011580 | 1/2005 |
| JP | 2007-240434 | 9/2007 |
| JP | 2009-148845 | 7/2009 |
| JP | 2011-000669 | 1/2011 |

OTHER PUBLICATIONS

Japanese Office Action for corresponding JP Application No. 2011-091398, May 7, 2013.
Chinese Office Action for corresponding CN Application No. 201210048457.0, Sep. 26, 2014.

* cited by examiner

*Primary Examiner* — Ian Jen
(74) *Attorney, Agent, or Firm* — Mori & Ward, LLP

(57) ABSTRACT

In this robot system, a control portion is configured to control a robot to grasp an object to be grasped by a grasping portion, and control a first imaging portion to examine the object to be grasped while driving a robot arm to change a posture of the object to be grasped multiple times.

18 Claims, 16 Drawing Sheets

ROBOT SYSTEM AND PROCESSED OBJECT MANUFACTURING METHOD

CROSS-REFERENCE TO RELATED APPLICATIONS

The priority application number JP2011-091398, Robot System and Examination Method Employing Robot System, Apr. 15, 2011, Yoshimitsu Nakahara, upon which this patent application is based is hereby incorporated by reference.

BACKGROUND OF THE INVENTION

1. Field of the Invention

The present invention relates to a robot system and a processed object manufacturing method.

2. Description of the Background Art

Japanese Patent Laying-Open No. 2011-000669 discloses a robot system (working articulated robot system) including a dual-arm robot and a camera (imaging portion) fixedly mounted to a first robot arm of the dual-arm robot.

SUMMARY OF THE INVENTION

A robot system according to a first aspect of an embodiment includes a robot including a robot arm mounted with a grasping portion to grasp an object to be grasped, a first imaging portion to examine the object to be grasped that is being grasped by the grasping portion, disposed separately from the robot arm, and a control portion configured to operate the robot and the first imaging portion, while the control portion is configured to operate the robot to grasp the object to be grasped by the grasping portion, and operate the first imaging portion to examine the object multiple times while operating the robot arm to change a posture of the object.

A processed object manufacturing method according to a second aspect of the embodiment includes grasping an object to be grasped by a grasping portion mounted to a robot arm, examining the object multiple times by an imaging portion disposed separately from the robot arm while operating the robot arm to change a posture of the object that is being grasped by the grasping portion, putting the object to a processing machine, and processing the object by the processing machine.

An examination method employing a robot system according to a third aspect of the embodiment includes grasping an object to be grasped by a grasping portion mounted to a robot arm, and examining the object to be grasped by a first imaging portion fixedly set separately from the robot arm while driving the robot arm to change a posture of the object to be grasped that is being grasped by the grasping portion multiple times.

DESCRIPTION OF THE EMBODIMENTS

Embodiments are now described with reference to the drawings.

(First Embodiment)

First, the structure of a robot system 100 according to a first embodiment is described with reference to FIGS. 1 and 2.

Figure 1:
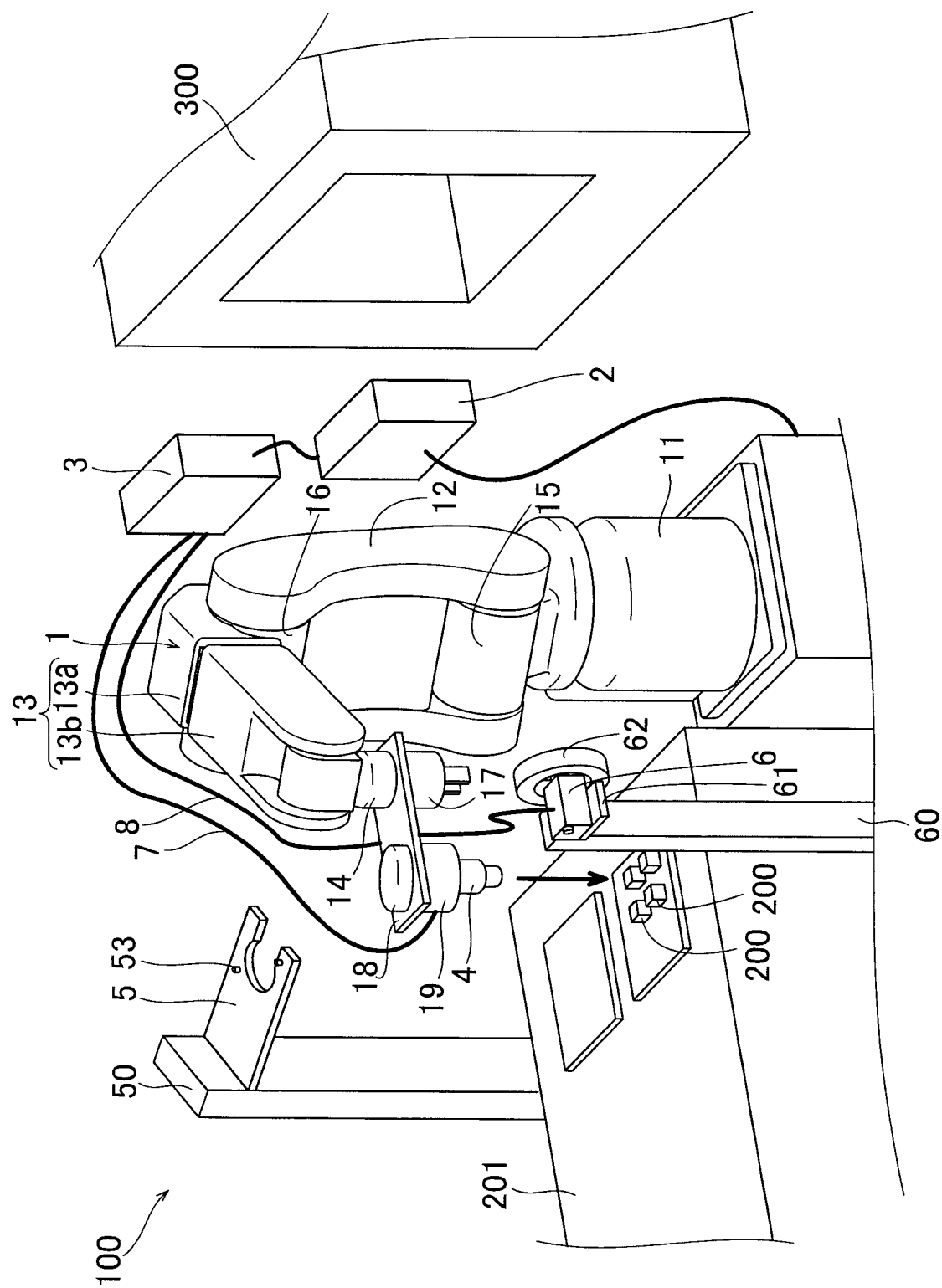
FIG. 1 is an overall view of a robot system according to a first embodiment.

As shown in FIG. 1, the robot system 100 includes a robot 1, a robot controller 2 controlling the overall operation of the robot system 100, an image processing system 3 to process an image, a position confirmation camera 4 to confirm the positions of works (objects) 200, a placement portion 5 to place the position confirmation camera 4, and an examination camera 6 to examine the works 200. A workbench 201 is arranged adjacent to the robot system 100, and a plurality of the works 200 (four works 200 in the first embodiment) are placed on the workbench 201. A processing machine 300 to process the works 200 is arranged adjacent to the robot system 100. The position confirmation camera 4 is an example of the "second imaging portion". The examination camera 6 is an example of the "first imaging portion". The works 200 are examples of the "object to be grasped".

Figure 2:
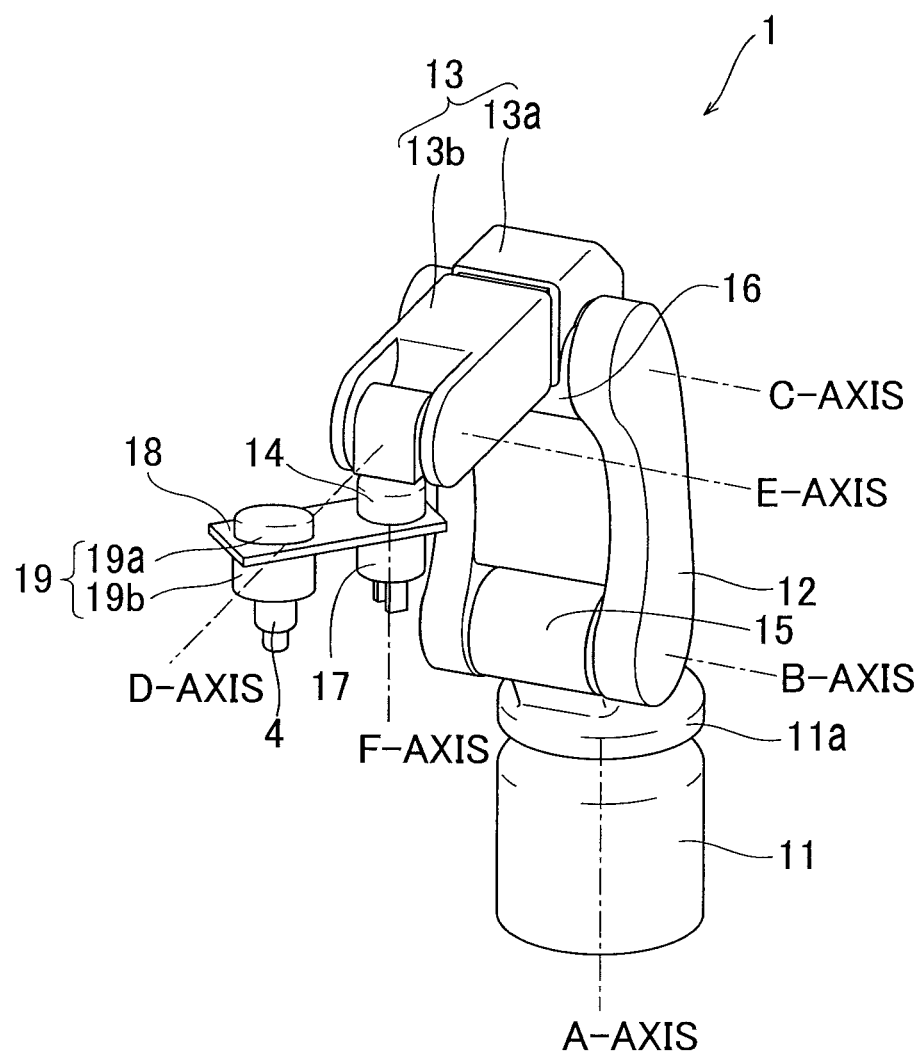
FIG. 2 is an overall view of a robot of the robot system according to the first embodiment.

As shown in FIG. 2, the robot 1 is constituted by a base 11, a lower arm 12, an upper arm 13, and a wrist joint 14. The base 11 is provided with a rotating portion 11a, and the rotating portion 11a is formed to be rotatable about an A-axis. The base 11 and the lower arm 12 are connected to each other by a first joint 15. The first joint 15 is formed to rotate the lower arm 12 about a B-axis. The lower arm 12 and the upper arm 13 are connected to each other by a second joint 16. The upper arm 13 includes a first upper arm portion 13a connected to the second joint 16 and a second upper arm portion 13b connected to the wrist joint 14. The second joint 16 is formed to rotate the upper arm 13 about a C-axis. The second upper arm portion 13b is formed to rotate about a D-axis. The wrist joint 14 is formed to rotate about an E-axis and an F-axis. In other words, according to the first embodiment, the robot 1 is constituted by a six-axis vertical articulated robot rotatable about the A-axis to the F-axis. A hand portion 17 to grasp the works 200 is mounted on an end of the wrist joint 14. A camera mounting 18 to mount the position confirmation camera 4 is provided on the wrist joint 14. The lower arm 12, the upper arm 13, and the wrist joint 14 are examples of the "robot arm". The hand portion 17 is an example of the "grasping portion".

The position confirmation camera 4 is detachably mounted on the camera mounting 18 through a camera attaching/detaching portion 19. The camera attaching/detaching portion 19 includes an automatic tool changer (ATC), for example. This camera attaching/detaching portion 19 is constituted by a body portion 19a and an attaching/detaching portion 19b. The attaching/detaching portion 19b is attached to the position confirmation camera 4, and fixed to the body portion 19a by the pressure of air. Thus, the position confirmation camera 4 is mounted to the wrist joint 14 (camera mounting 18). The position confirmation camera 4 includes a camera body, a lens, and a light. The position confirmation camera 4 is provided to take an image of the plurality of works 200 and confirm the positions of the works 200. The position confirmation camera 4 and the image processing system 3 are connected to each other by a wire 7 (see FIG. 1), and the examination camera 6 and the image processing system 3 are connected to each other by a wire 8 (see FIG. 1). When the position confirmation camera 4 is detached from the camera mounting 18, the wire 7 in addition to the position confirmation camera 4 is detached from the robot 1. The wires 7 and 8 are made of a shielded wire obtained by covering a signal wire, for example.

Figure 3:
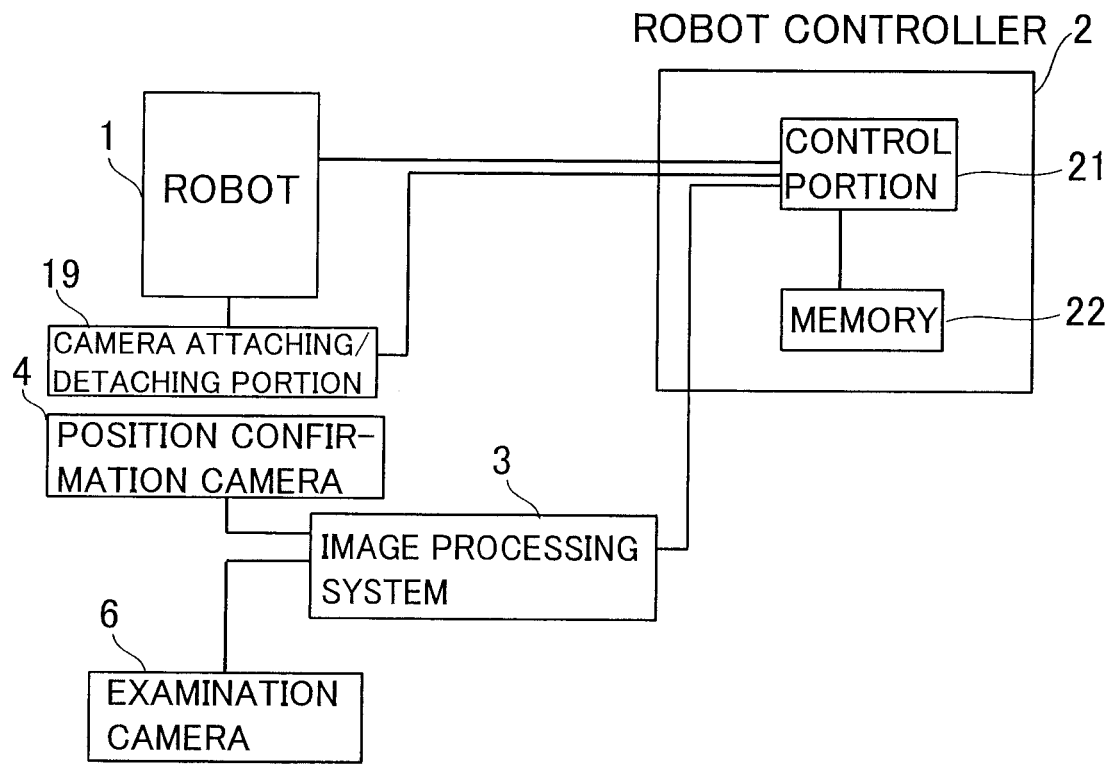
FIG. 3 is a block diagram of the robot system according to the first embodiment.

As shown in FIG. 3, the robot controller 2 is provided with a control portion 21 and a memory 22. The memory 22 is connected to the control portion 21. The robot 1 and the image processing system 3 are connected to the control portion 21 of the robot controller 2. The camera attaching/detaching portion 19 to attach/detach the position confirmation camera 4 is connected to the control portion 21 of the robot controller 2. The position confirmation camera 4 and the examination camera 6 are connected to the image processing system 3. According to the first embodiment, the control portion 21 is so formed as to control the camera attaching/detaching portion 19 to detach the position confirmation camera 4 from the camera mounting 18 mounted on the wrist joint 14 after confirming the positions of the plurality of works 200 (all four works 200 in the first embodiment) on the basis of the image taken by the position confirmation camera 4 and before moving a work 200 that is being grasped by the hand portion 17 into the processing machine 300.

Figure 4:
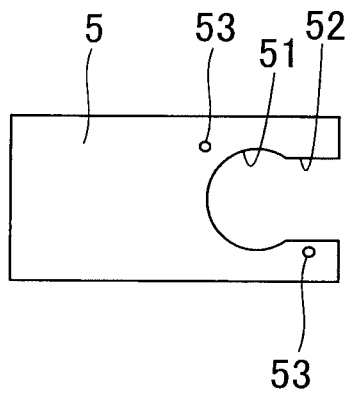
FIG. 4 is a plan view of a placement portion to place a position confirmation camera of the robot system according to the first embodiment.

As shown in FIG. 1, the placement portion 5 to place the position confirmation camera 4 detached from the camera mounting 18 is mounted on a pillar portion 50. As shown in FIG. 4, the placement portion 5 is provided in the form of a plate, and provided with a hole 51 into which the position confirmation camera 4 is inserted. The hole 51 is so provided as to be continuous with a notch 52 provided on one end of the placement portion 5 in the form of a plate. The placement portion 5 is also provided with bosses 53 to position the position confirmation camera 4 when the position confirmation camera 4 detached from the camera mounting 18 is placed. A plurality of the bosses 53 (two bosses 53 in the first embodiment) are so provided as to hold the position confirmation camera 4 therebetween in plan view (top view) in a state where the position confirmation camera 4 is placed on the placement portion 5 (see FIG. 9).

According to the first embodiment, the examination camera 6 is fixedly mounted on a placement portion 61 mounted on a pillar portion 60, and provided separately from the robot 1, as shown in FIG. 1. A ring-shaped lighting portion 62 is arranged near the examination camera 6. A plurality of LEDs (not shown) are attached to the ring-shaped lighting portion 62. The lighting portion 62 is provided to emit light to the work 200 that is being grasped by the hand portion 17. According to the first embodiment, the control portion 21 controls the camera attaching/detaching portion 19 to detach the position confirmation camera 4 after taking an image of the works 200 and confirming the positions of the works 200 by the position confirmation camera 4, controls the robot 1 to grasp one of the works 200 by the hand portion 17, and controls the examination camera 6 to examine the work 200 while driving the rotating portion 11a of the base 11, the lower arm 12, the upper arm 13, and the wrist joint 14 about multiple axes (A-axis to F-axis in FIG. 2) to change the posture of the work 200 multiple times. The control portion 21 examines whether or not the work 200 is a conforming article (whether or not the work 200 is scratched or deformed) on the basis of images of the work 200 taken by the examination camera 6.

The examination camera 6 is arranged near a path to move the work 200 that is being grasped by the hand portion 17 into the processing machine 300. This path is previously taught to the robot controller 2. The robot system 100 is so formed as to examine the work 200 that is being grasped by the hand portion 17 by the examination camera 6 before the work 200 is moved into the processing machine 300.

The processing machine 300 (see FIG. 1) has a function of processing (cutting, machining, lathing, grinding, NC machining, or the like) the works. When the works 200 are processed in the processing machine 300, dust generated when the works 200 are processed, coolant to cool the processing machine 300, oil, etc. are generated in the processing machine 300.

Next, operations of the control portion 21 of the robot system 100 are described with reference to FIGS. 1 and 5 to 15.

First, the position confirmation camera 4 is mounted on the camera mounting 18 of the robot 1, and the robot 1 is so driven that the position confirmation camera 4 is arranged above the works 200 on the workbench 201, as shown in FIG. 1. Then, an image of the works 200 is taken by the position confirmation camera 4 in the state where the position confirmation camera 4 is arranged above the works 200, as shown at a step S1 in FIG. 5. According to the first embodiment, an image of all the works 200 (four works 200) is taken. The image taken by the position confirmation camera 4 is processed by the image processing system 3, and processed data is transmitted to the robot controller 2 to be stored in the memory 22. The robot controller 2 calculates (confirms) positions where the works 200 are arranged on the basis of the data stored in the memory 22. Then, the control portion 21 advances to a step S2.

Figure 5:
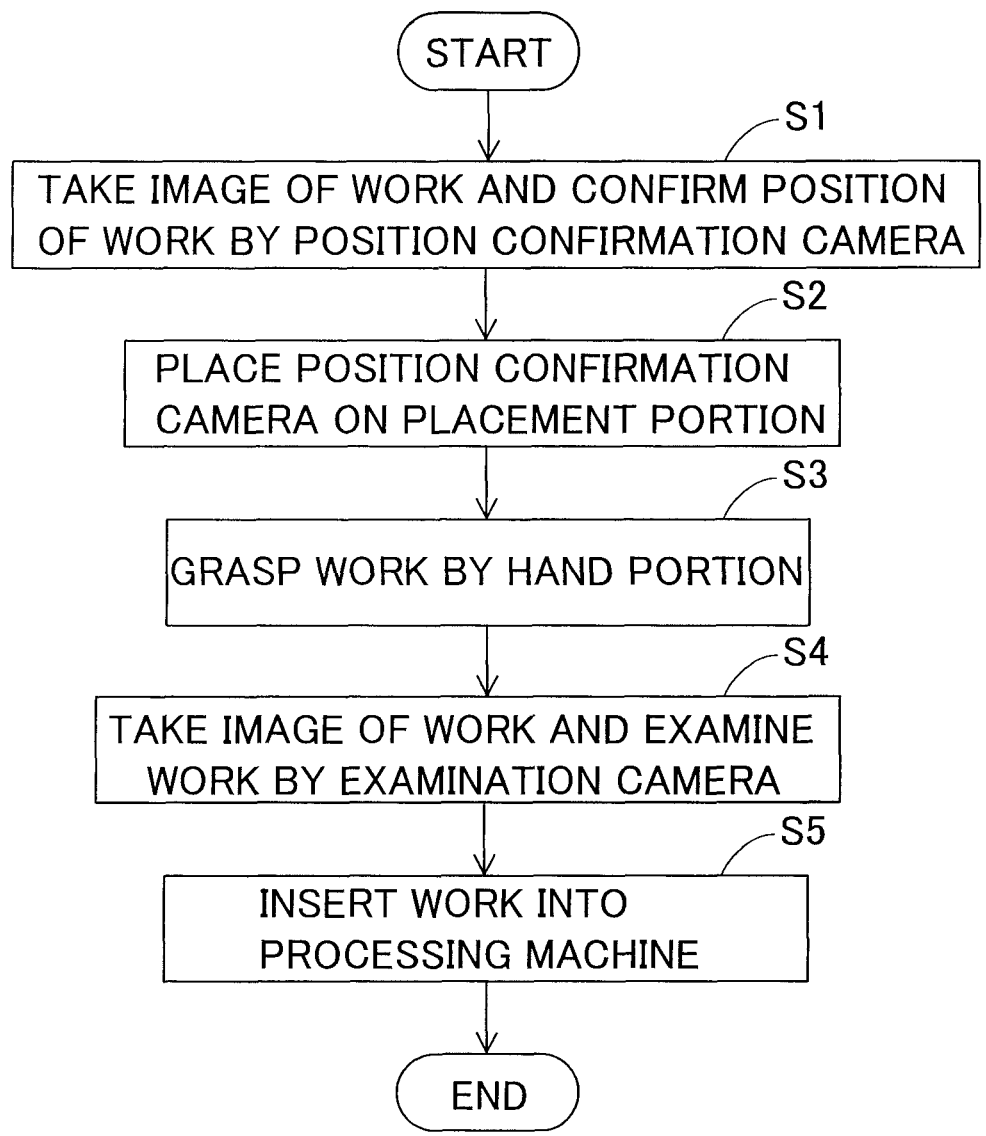
FIG. 5 is a flowchart for illustrating operations of the robot system according to the first embodiment.
Figure 6:
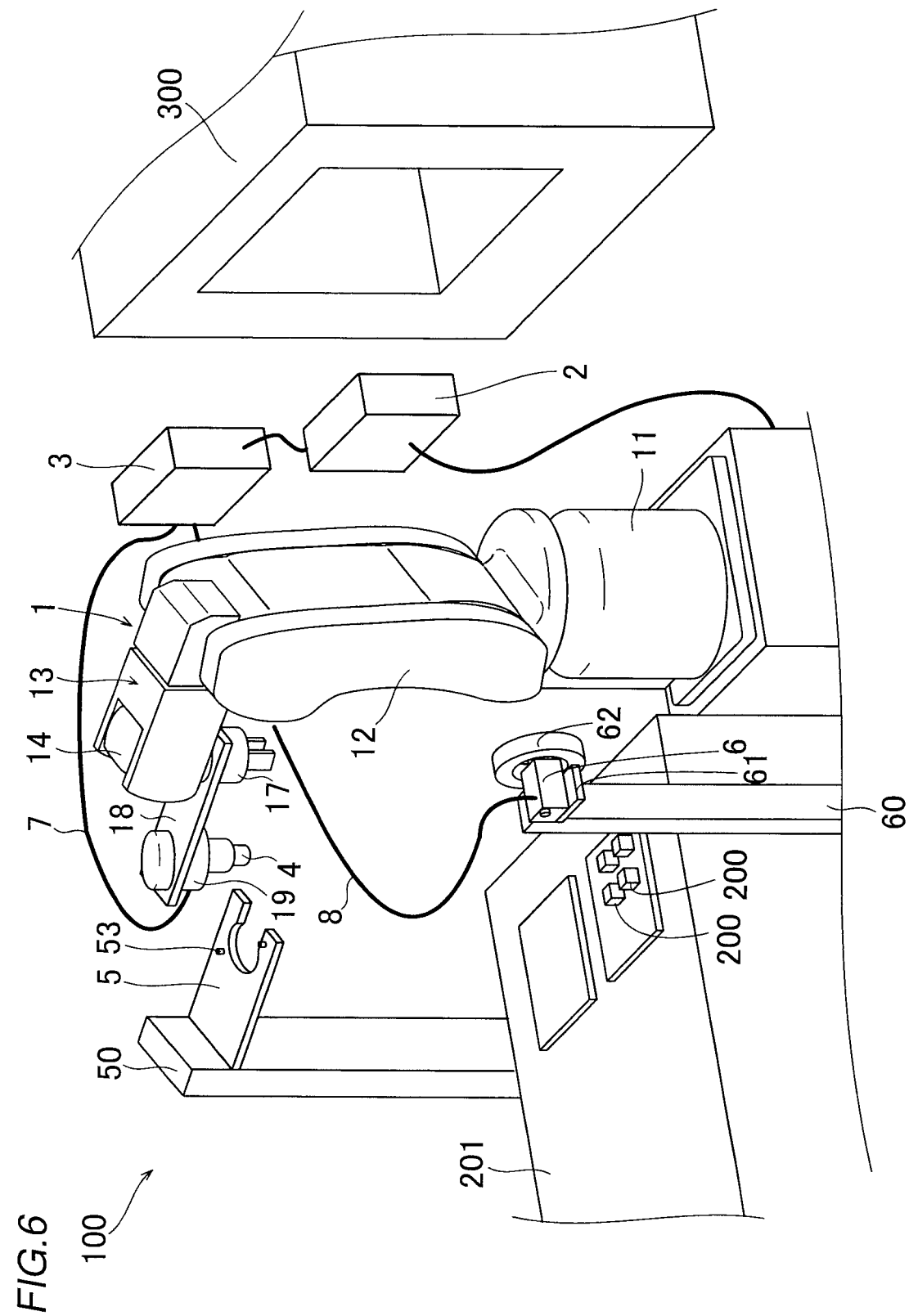
FIG. 6 is a diagram showing a state of moving the position confirmation camera of the robot system according to the first embodiment to the placement portion.
Figure 7:
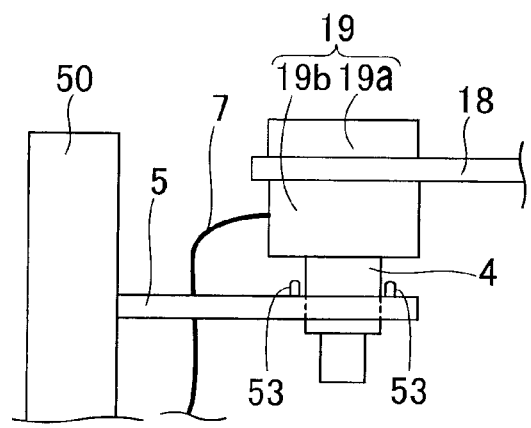
FIG. 7 is a side elevational view showing a state of inserting the position confirmation camera of the robot system according to the first embodiment into the placement portion.
Figure 8:
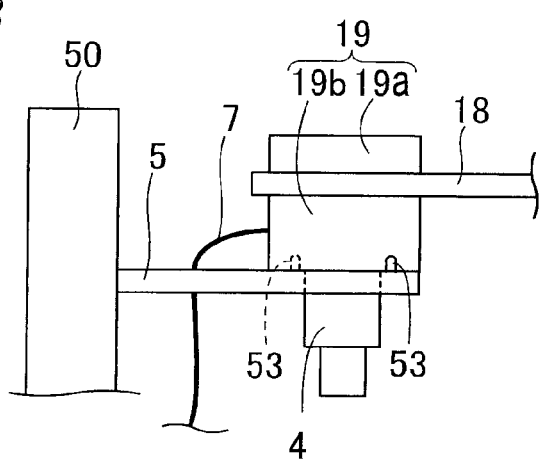
FIG. 8 is a side elevational view showing a state of placing the position confirmation camera of the robot system according to the first embodiment on the placement portion.
Figure 9:
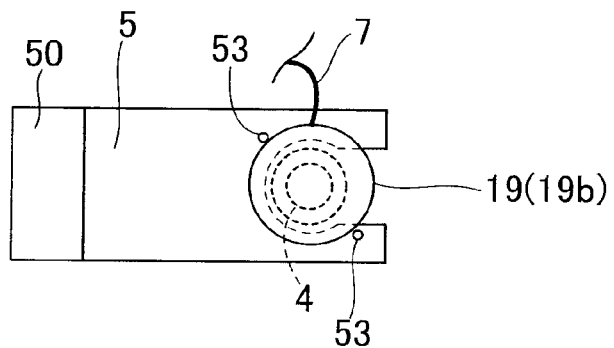
FIG. 9 is a top plan view showing a state of placing the position confirmation camera of the robot system according to the first embodiment on the placement portion.

As shown in FIG. 5, the robot 1 (the rotating portion 11a of the base 11, the first joint 15, the second joint 16, and the wrist joint 14) is so driven that the position confirmation camera 4 is moved near the placement portion 5 as shown in FIG. 6 at the step S2. Then, the position confirmation camera 4 is inserted into the hole 51 of the placement portion 5 along the bosses 53, as shown in FIG. 7, and the position confirmation camera 4 is placed on the placement portion 5, as shown in FIG. 8. In a state where the position confirmation camera 4 is placed on the placement portion 5, the outer surface of the camera attaching/detaching portion 19 (attaching/detaching portion 19b) comes into contact with the two bosses 53 as shown in FIG. 9 so that the camera attaching/detaching portion 19 (position confirmation camera 4) is positioned. Thereafter, the camera attaching/detaching portion 19 operates to detach the position confirmation camera 4 from the camera mounting 18 (wrist joint 14). At this time, the wire 7 in addition to the position confirmation camera 4 is also detached from the camera mounting 18. Then, the control portion 21 advances to a step S3.

Figure 10:
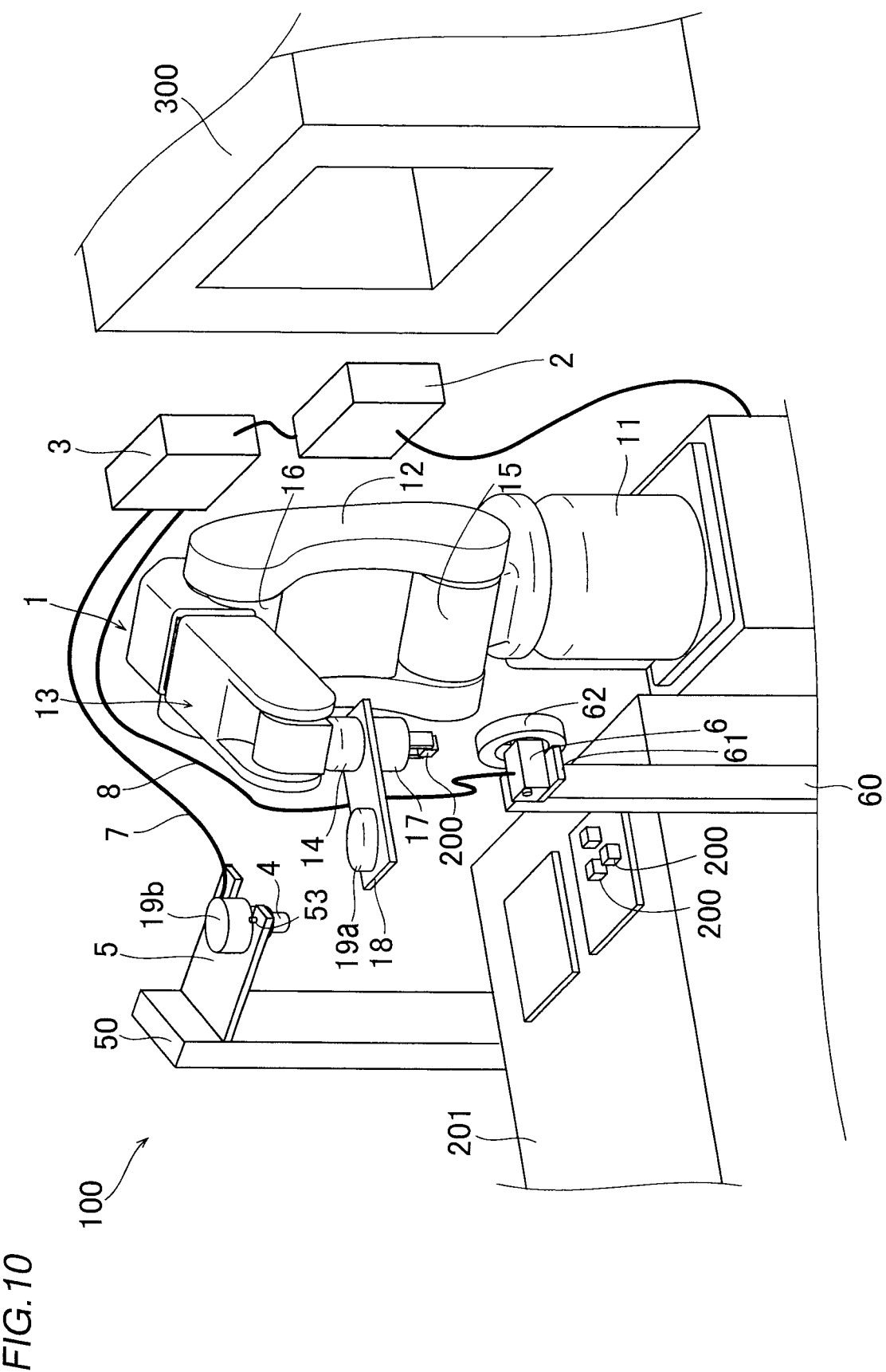
FIG. 10 is a diagram showing a state of grasping a work by a hand portion of the robot system according to the first embodiment.

As shown in FIG. 5, the robot 1 is so driven on the basis of the positions where the works 200 are arranged calculated (confirmed) by the robot controller 2 that one of the works 200 is grasped by the hand portion 17 as shown in FIG. 10 at the step S3. Then, the control portion 21 advances to a step S4.

Figure 11:
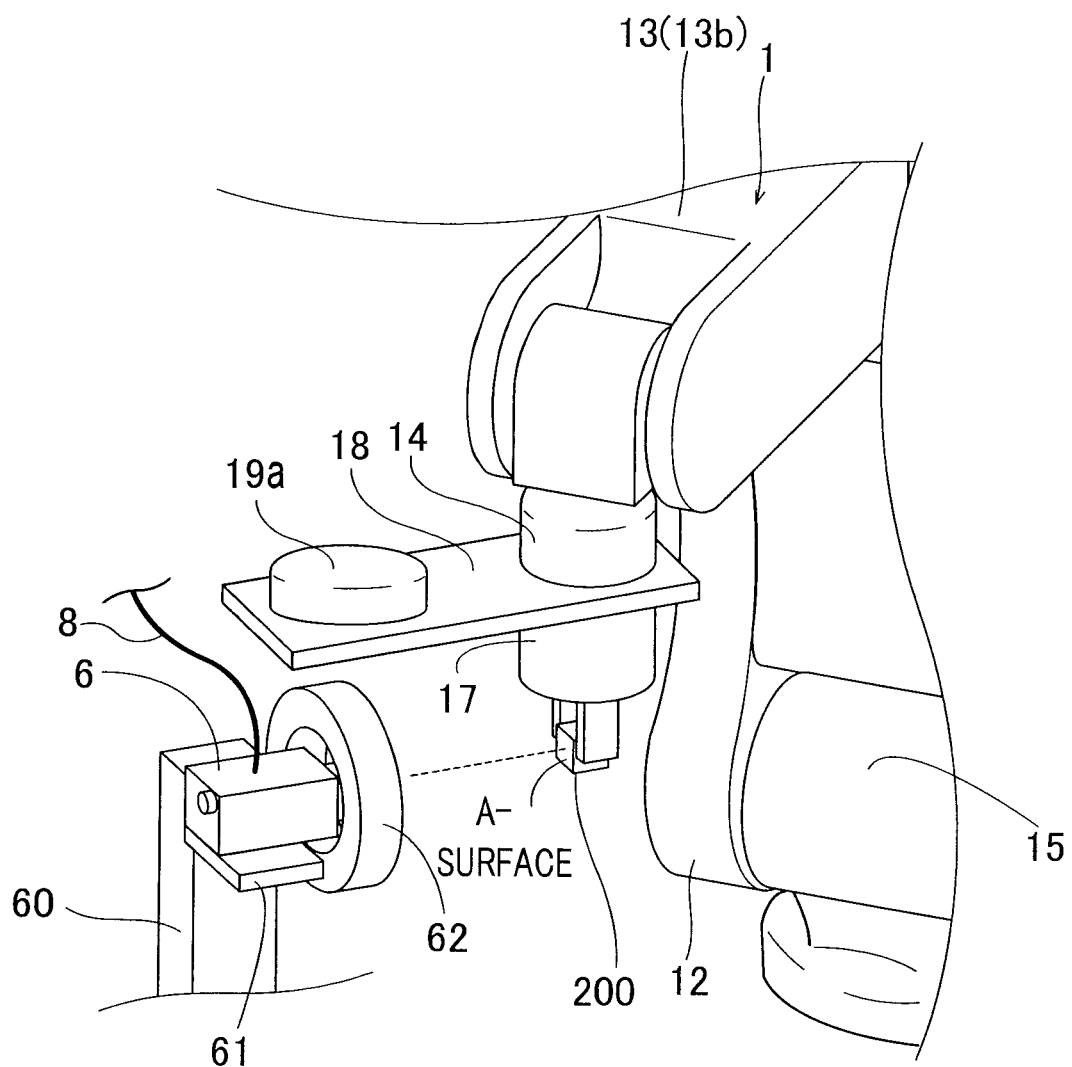
FIG. 11 is a diagram showing a state of examining (taking an image of) the work by an examination camera of the robot system according to the first embodiment.

As shown in FIG. 5, the robot 1 is so driven that the work 200 that is being grasped by the hand portion 17 is arranged in front of the examination camera 6 as shown in FIG. 11, and images of the work 200 are taken by the examination camera 6 at the step S4. At this time, the ring-shaped lighting portion 62 emits light to the work 200 that is being grasped by the hand portion 17. Thus, an image of an A-surface of the work 200 is taken.

Figure 12:
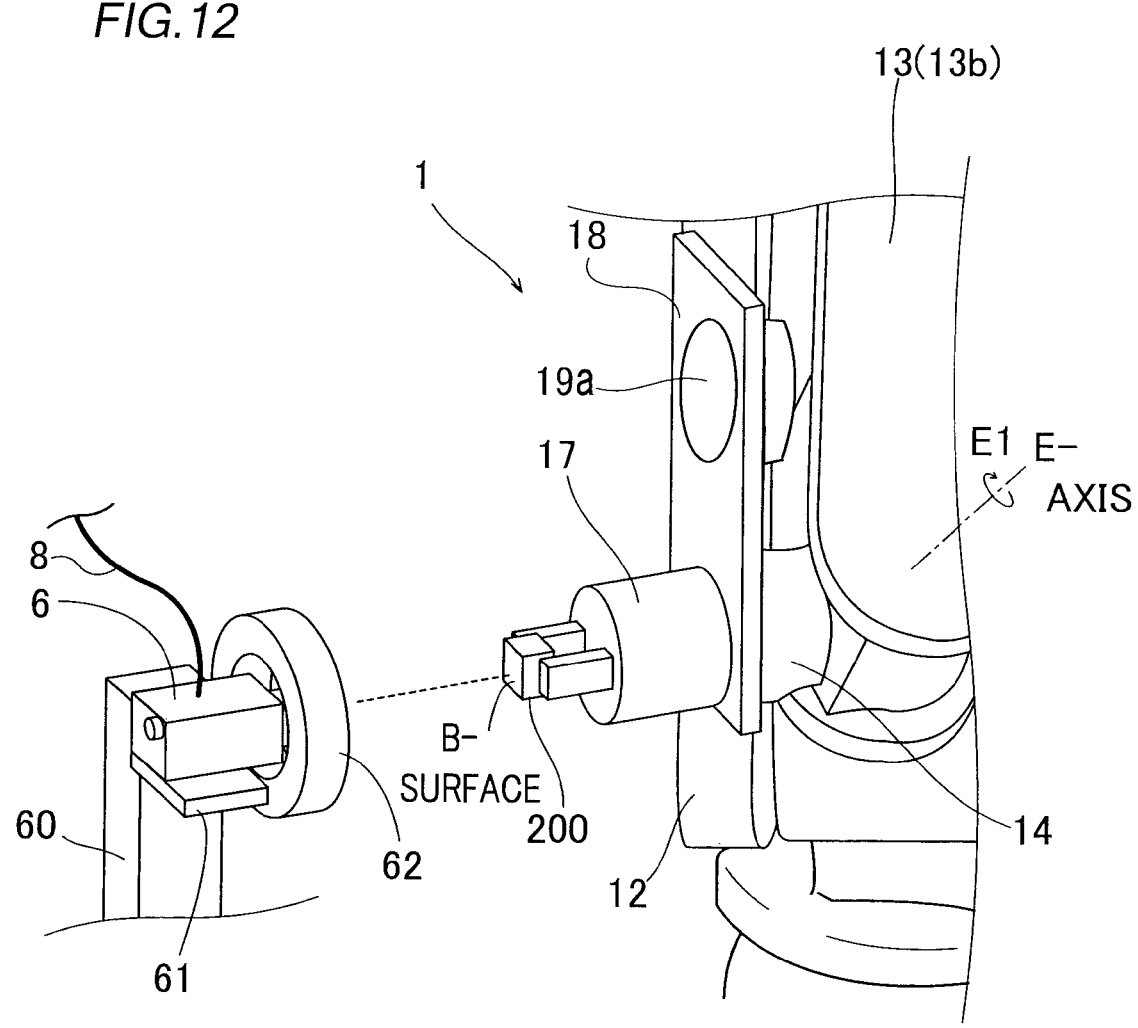
FIG. 12 is a diagram showing a state of examining (taking an image of) the work by rotating the hand portion by 90° in a direction E1 about an E-axis from the state shown in FIG. 11.

As shown in FIG. 12, the wrist joint 14 is rotated by 90° in a direction E1 about the E-axis from the state shown in FIG. 11 to change the posture of the work 200, and an image of the work 200 is taken by the examination camera 6. Thus, an image of a B-surface of the work 200 is taken. The robot system 100 may be so formed as to take an image of the work 200 once after the work 200 is postured as shown in FIG. 12, or may be so formed as to take images of the work 200 continuously during rotation of the wrist joint 14.

Figure 13:
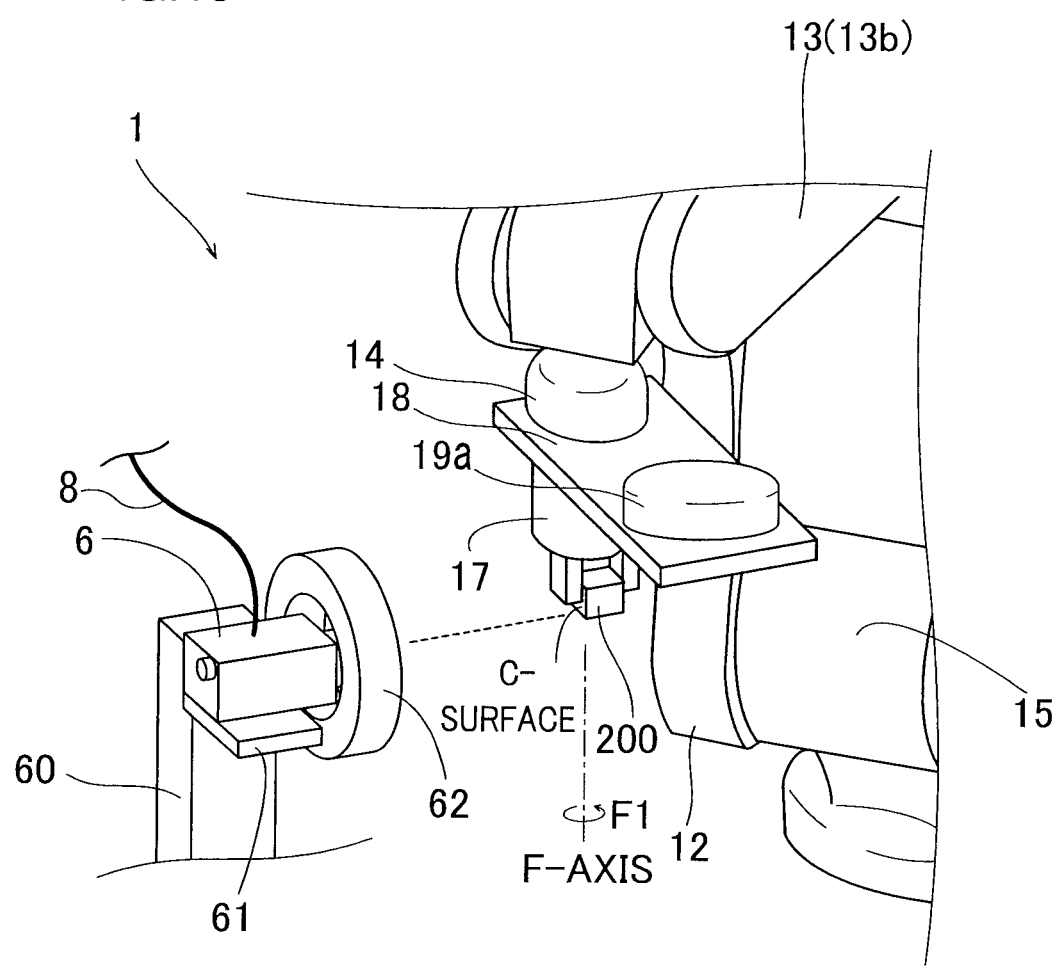
FIG. 13 is a diagram showing a state of examining (taking an image of) the work by rotating the hand portion by 90° in a direction F1 about an F-axis from the state shown in FIG. 11.

As shown in FIG. 13, the wrist joint 14 is rotated by 90° in a direction F1 about the F-axis from the state shown in FIG. 11 to change the posture of the work 200, and an image of the work 200 is taken by the examination camera 6. Thus, an image of a C-surface of the work 200 is taken.

Figure 14:
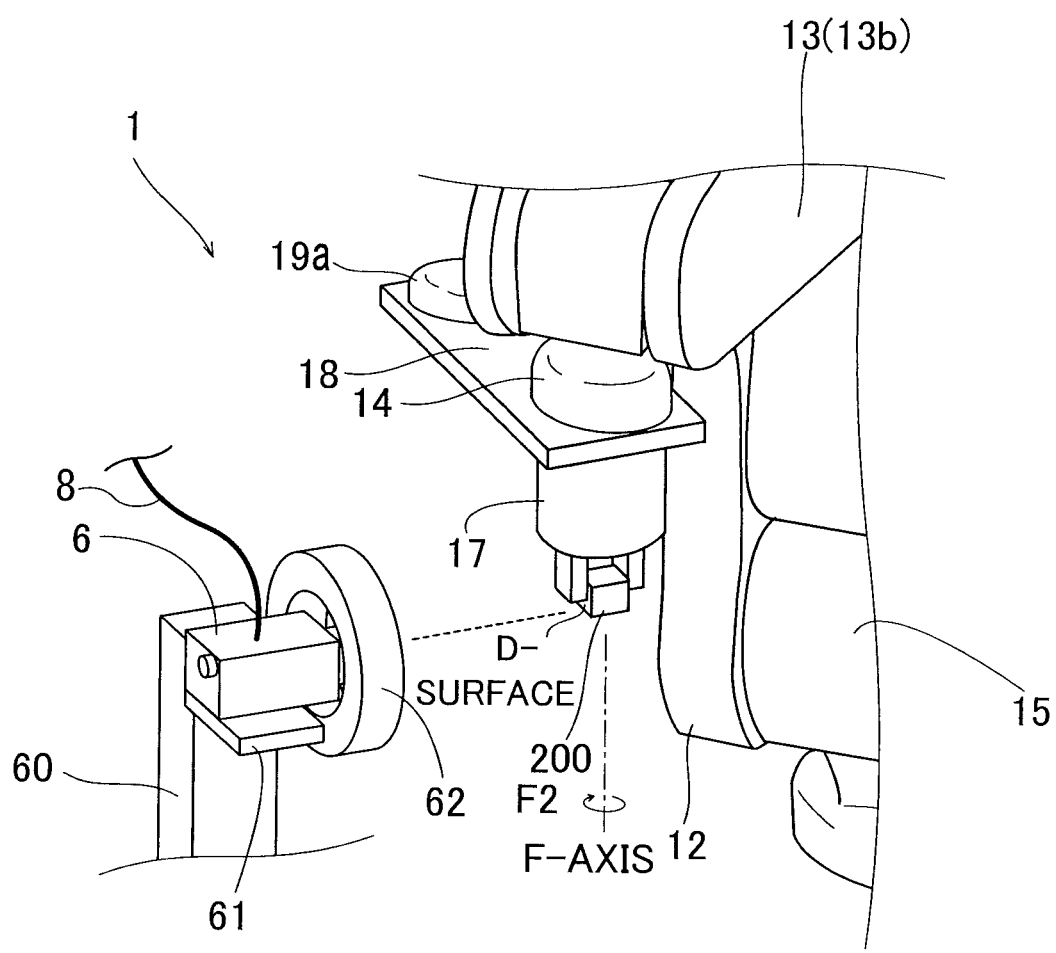
FIG. 14 is a diagram showing a state of examining (taking an image of) the work by rotating the hand portion by 90° in a direction F2 about the F-axis from the state shown in FIG. 11.

As shown in FIG. 14, the wrist joint 14 is rotated by 90° in a direction F2 about the F-axis from the state shown in FIG. 11 to change the posture of the work 200, and an image of the work 200 is taken by the examination camera 6. Thus, an image of a D-surface of the work 200 is taken. The images taken by the examination camera 6 are processed by the image processing system 3, and processed data is transmitted to the robot controller 2 to be stored in the memory 22. The robot controller 2 examines whether or not the surface of the work 200 is scratched, whether or not the work 200 is deformed, etc., for example, on the basis of the data stored in the memory 22. Then, the control portion 21 advances to a step S5.

Figure 15:
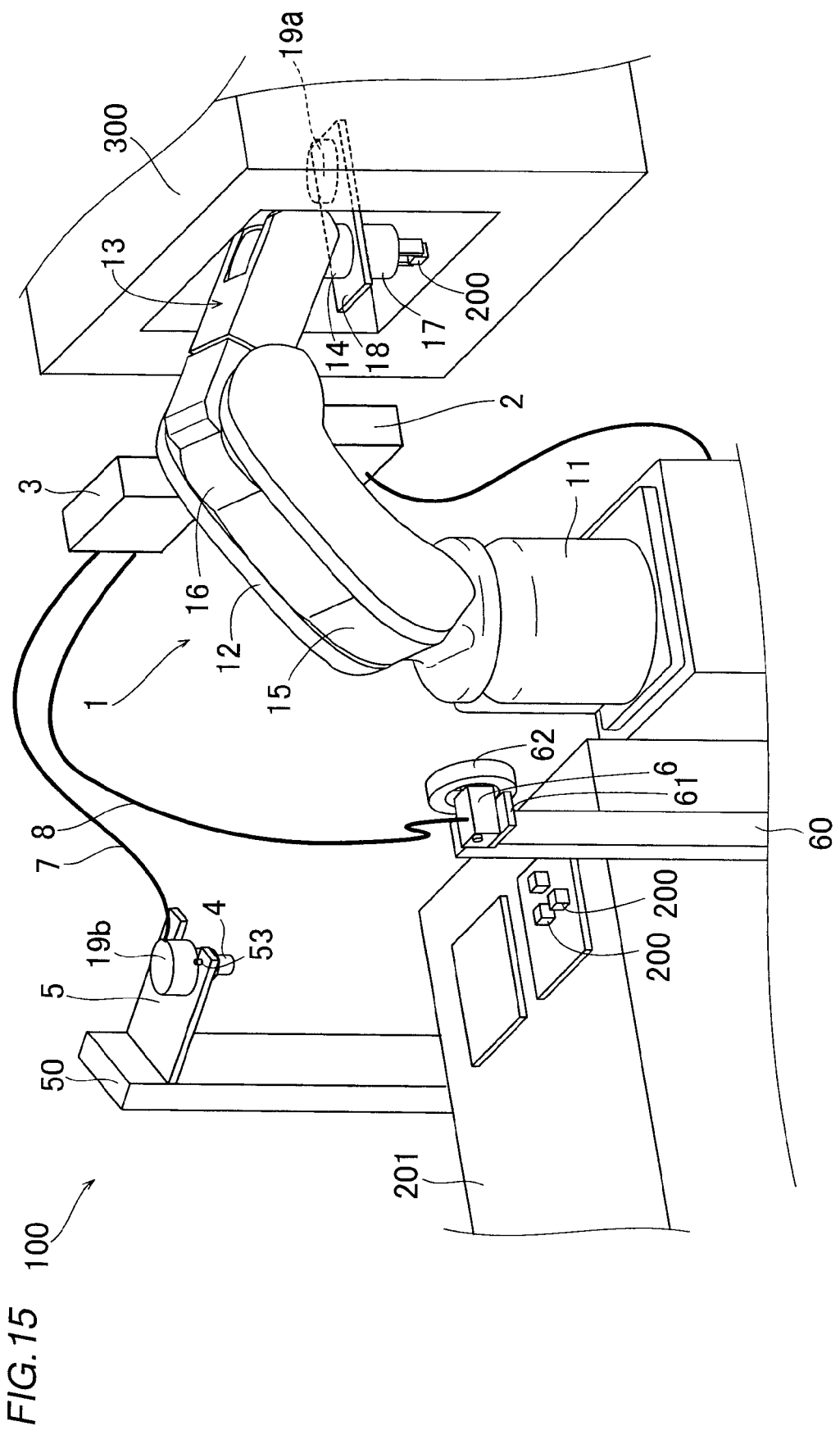
FIG. 15 is a diagram showing a state of inserting the work into a processing machine by the hand portion of the robot system according to the first embodiment.

As shown in FIG. 5, the robot 1 is so driven that the work 200 is inserted into the processing machine 300 (the work 200 is put to the processing machine 300) as shown in FIG. 15 at the step S5, and the work 200 is processed. Thereafter, the steps S3 to S5 are so repeated that all the works 200 are processed.

According to the first embodiment, as hereinabove described, the control portion 21 controls the examination camera 6 fixedly set separately from the robot 1 to examine the work 200 while driving the robot 1 (the rotating portion 11a of the base 11, the lower arm 12, the upper arm 13, and the wrist joint 14) to change the posture of the work 200 multiple times. Thus, the posture of the work 200 is changed multiple times by the robot 1 relatively with respect to the examination camera 6 fixedly set separately from the robot 1, and hence the work 200 can be examined from multiple angles of view by the examination camera 6.

According to the first embodiment, as hereinabove described, the robot 1 is constituted by a vertical articulated robot capable of being driven about multiple axes (A-axis to F-axis), the work 200 is grasped by the hand portion 17, and the control portion 21 controls the examination camera 6 to examine the work 200 while driving the robot 1 about the multiple axes to change the posture of the work 200 multiple times. Thus, the posture of the work 200 can be easily changed multiple times, and hence the work 200 can be easily examined from multiple angles of view.

According to the first embodiment, as hereinabove described, the control portion 21 examines whether or not the works 200 are conforming articles on the basis of the images of the works 200 taken by the examination camera 6. Thus, a scratch or the like on the surfaces of the works 200 is detected, whereby a defective work 200 can be suppressed from being processed by the processing machine 300.

According to the first embodiment, as hereinabove described, the control portion 21 controls the camera attaching/detaching portion 19 to detach the position confirmation camera 4 after taking an image of the works 200 and confirming the positions of the works 200 by the position confirmation camera 4. Thus, the position confirmation camera 4 has been already detached when the work 200 that is being grasped by the hand portion 17 is moved into the processing machine 300 (adverse environment), and hence degradation in the performance of the position confirmation camera 4 due to oil, dust, etc. in the adverse environment can be suppressed.

According to the first embodiment, as hereinabove described, the robot system 100 is provided with the lighting portion 62 to emit light to the work 200, arranged near the examination camera 6 set separately from the robot 1. Thus, the posture of the work 200 is changed multiple times, whereby the light from the lighting portion 62 is emitted to the work 200 from multiple angles, and hence a scratch or the like on the surface of the work 200 can be reliably detected.

According to the first embodiment, as hereinabove described, the examination camera 6 is arranged near the path to move the work 200 that is being grasped by the hand portion 17 into the processing machine 300. Thus, the time (takt time) required for steps from grasping the work 200 through examining the work 200 to moving the work 200 into the processing machine 300 can be reduced, dissimilarly to a case where the examination camera 6 is distanced from the path to move the work 200 into the processing machine 300.

According to the first embodiment, as hereinabove described, the work 200 is examined by the examination camera 6 before the work 200 that is being grasped by the hand portion 17 is moved into the processing machine 300. Thus, a defective work 200 can be suppressed from being moved into the processing machine 300.

(Second Embodiment)

A second embodiment is now described with reference to FIGS. 16 and 17. In this second embodiment, a robot system 101 is provided with two robots 1 and 70, dissimilarly to the aforementioned first embodiment in which the robot system 100 is provided with the single robot 1.

Figure 16:
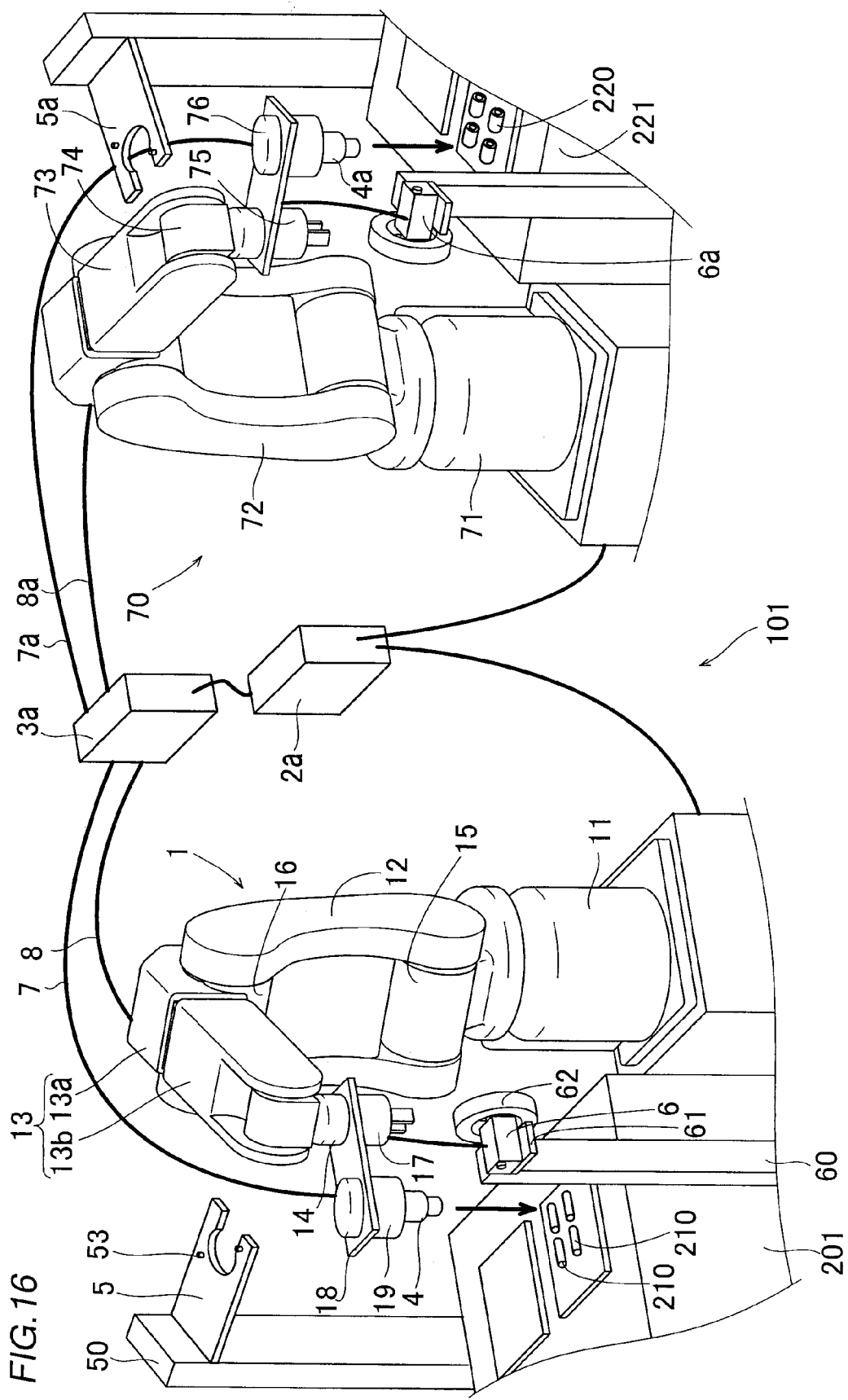
FIG. 16 is an overall view of a robot system according to a second embodiment.

As shown in FIG. 16, the robot system 101 according to the second embodiment includes the robot 1, a robot controller 2a controlling the overall operation of the robot system 101, an image processing unit (image processor) 3a to process an image, a position confirmation camera 4 to confirm the positions of works 210 each made of a shaft, for example, a placement portion 5 to place the position confirmation camera 4, and an examination camera 6 to examine the works 210, similarly to the aforementioned first embodiment. The robot 1 and the placement portion 5 are similar in structure to those in the aforementioned first embodiment. The works 210 each made of a shaft, for example, grasped by a hand portion 17 of the robot 1 are arranged on a workbench 201. The robot 1 is an example of the "first robot". The works 210 are examples of the "first object to be grasped".

The examination camera 6 is arranged near a path to move a work 210 that is being grasped by the hand portion 17 to a position where the work 210 is combined with a work 220 that is being grasped by a hand portion 75 of the robot 70. The work 210 that is being grasped by the hand portion 17 is examined by the examination camera 6 before the work 210 is moved to the position where the work 210 is combined with the work 220 that is being grasped by the hand portion 75 of the robot 70.

The robot system 101 further includes the robot 70, a position confirmation camera 4a to confirm the positions of works 220 each made of a shaft bearing, for example, a placement portion 5a to place the position confirmation camera 4a, and an examination camera 6a to examine the works 220. The robot 70 is constituted by a base 71, a lower arm 72, an upper arm 73, and a wrist joint 74, similarly to the robot 1. The hand portion 75 is mounted on the wrist joint 74. A camera attaching/detaching portion 76 of the robot 70 is connected to the image processing unit 3a through a wire 7a. The examination camera 6a is connected to the image processing unit 3a through a wire 8a. The structure of the placement portion 5a according to the second embodiment is similar to that of the placement portion 5 according to the first embodiment (see FIG. 4). The works 220 each made of a shaft bearing, for example, grasped by the hand portion 75 are arranged on a workbench 221. The robot 70 is an example of the "second robot". The examination camera 6a is an example of the "first imaging portion". The position confirmation camera 4a is an example of the "second imaging portion". The lower arm 72, the upper arm 73, and the wrist joint 74 are examples of the "robot arm". The hand portion 75 is an example of the "grasping portion". The works 220 are examples of the "second object to be grasped".

The examination camera 6a is arranged near a path to move the work 220 that is being grasped by the hand portion 75 to a position where the work 220 is combined with the work 210 that is being grasped by the hand portion 17 of the robot 1. The work 220 that is being grasped by the hand portion 75 is examined by the examination camera 6a before the work 220 is moved to the position where the work 220 is combined with the work 210 that is being grasped by the hand portion 17 of the robot 1.

Figure 17:
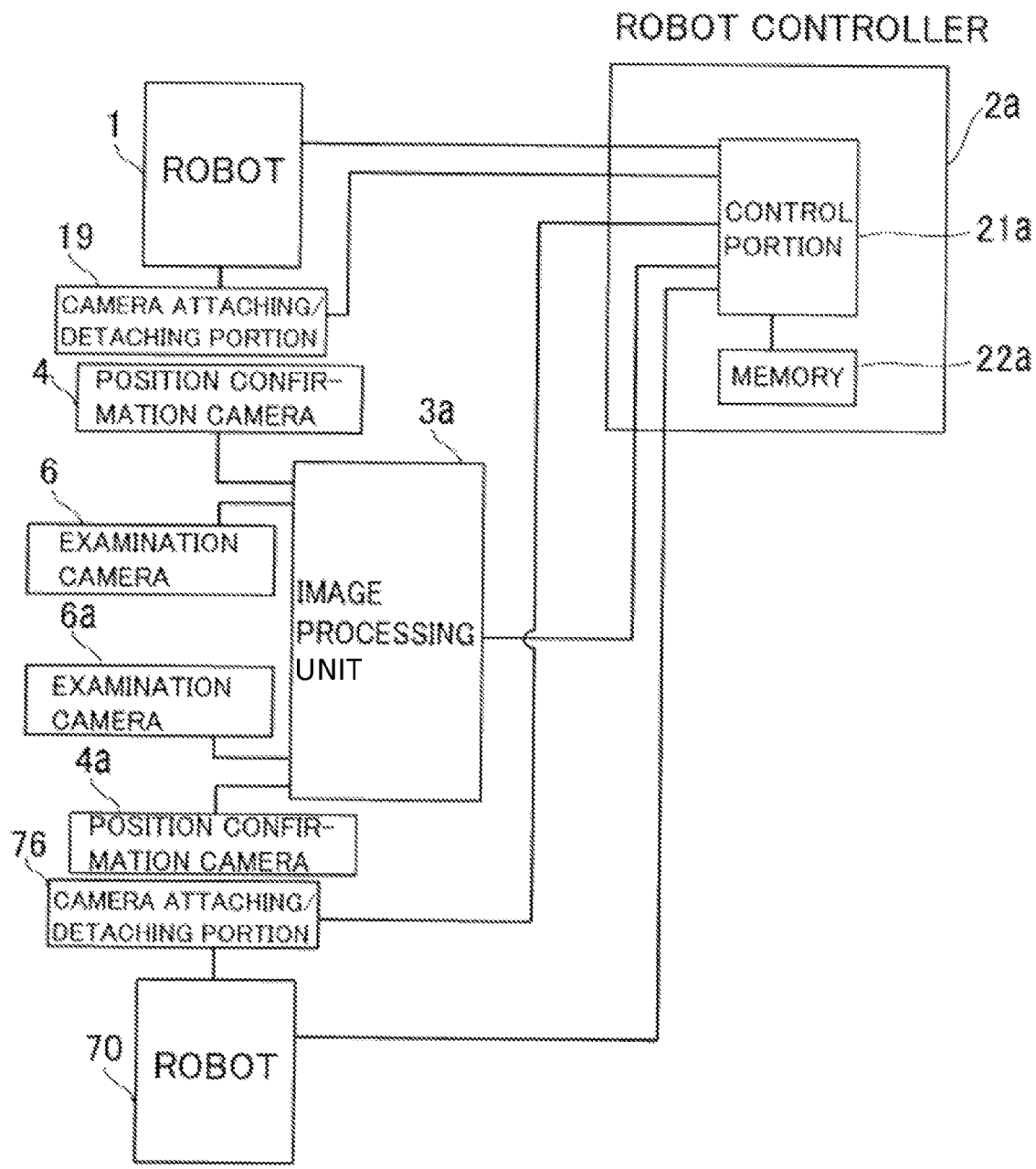
FIG. 17 is a block diagram of the robot system according to the second embodiment.

As shown in FIG. 17, the robot controller 2a is provided with a control portion 21a and a memory 22a. The memory 22a is connected to the control portion 21a. The robots 1 and 70 and the image processing unit 3a are connected to the control portion 21a of the robot controller 2a. Camera attaching/detaching portions 19 and 76 to attach/detach the position confirmation cameras 4 and 4a are connected to the control portion 21a of the robot controller 2a. The position confirmation cameras 4 and 4a and the examination cameras 6 and 6a are connected to the image processing unit 3a. According to the second embodiment, the control portion 21a is so formed as to examine a state of the work 210 (work 220) that is being grasped by the hand portion 17 (hand portion 75) on the basis of images taken by the examination camera 6 (examination camera 6a). Specifically, the control portion 21a examines a position where the work 210 (work 220) is being grasped by the hand portion 17 (hand portion 75), the posture of the work 210 (work 220), etc. Then, the control portion 21a combines the work 210 that is being grasped by the hand portion 17 of the robot 1 and the work 220 that is being grasped by the hand portion 75 of the robot 70 on the basis of the state of the work 210 that is being grasped by the hand portion 17 of the robot 1, having been examined by the examination camera 6 and the state of the work 220 that is being grasped by the hand portion 75 of the robot 70, having been examined by the examination camera 6a.

Operations of the control portion 21a of the robot system 101 are now described with reference to FIGS. 16 and 18.

First, the position confirmation camera 4 is mounted to the robot 1, and the robot 1 is so driven that the position confirmation camera 4 is arranged above the works 210 on the workbench 201, as shown in FIG. 16. Thereafter, the steps S1 to S4 in FIG. 5 are sequentially performed. In other words, an image of the works 210 is taken by the position confirmation camera 4, and the positions of the works 210 are confirmed on the basis of the image taken by the position confirmation camera 4. Then, the position confirmation camera 4 is detached to be placed on the placement portion 5, and thereafter one of the works 210 is grasped by the hand portion 17 of the robot 1. Then, images of the work 210 that is being grasped by the hand portion 17 of the robot 1 are taken by the examination camera 6 (see FIGS. 11 to 14) while the posture of the work 210 is changed multiple times. The state of the work 210 that is being grasped by the hand portion 17 (the position where the work 210 is being grasped, the posture of the work 210, etc.) is examined on the basis of the images of the work 210 taken by the examination camera 6.

Next, the robot 70 is so driven that the position confirmation camera 4a mounted to the robot 70 is arranged above the works 220 on the workbench 221. Thereafter, the steps S1 to S4 in FIG. 5 are sequentially performed, similarly to the case of the aforementioned robot 1. In other words, an image of the works 220 is taken by the position confirmation camera 4a, the positions of the works 220 are confirmed, the position confirmation camera 4a is detached, one of the works 220 is grasped by the hand portion 75, images of the work 220 are taken by the examination camera 6a, and the state of the work 220 that is being grasped by the hand portion 75 is examined.

Figure 18:
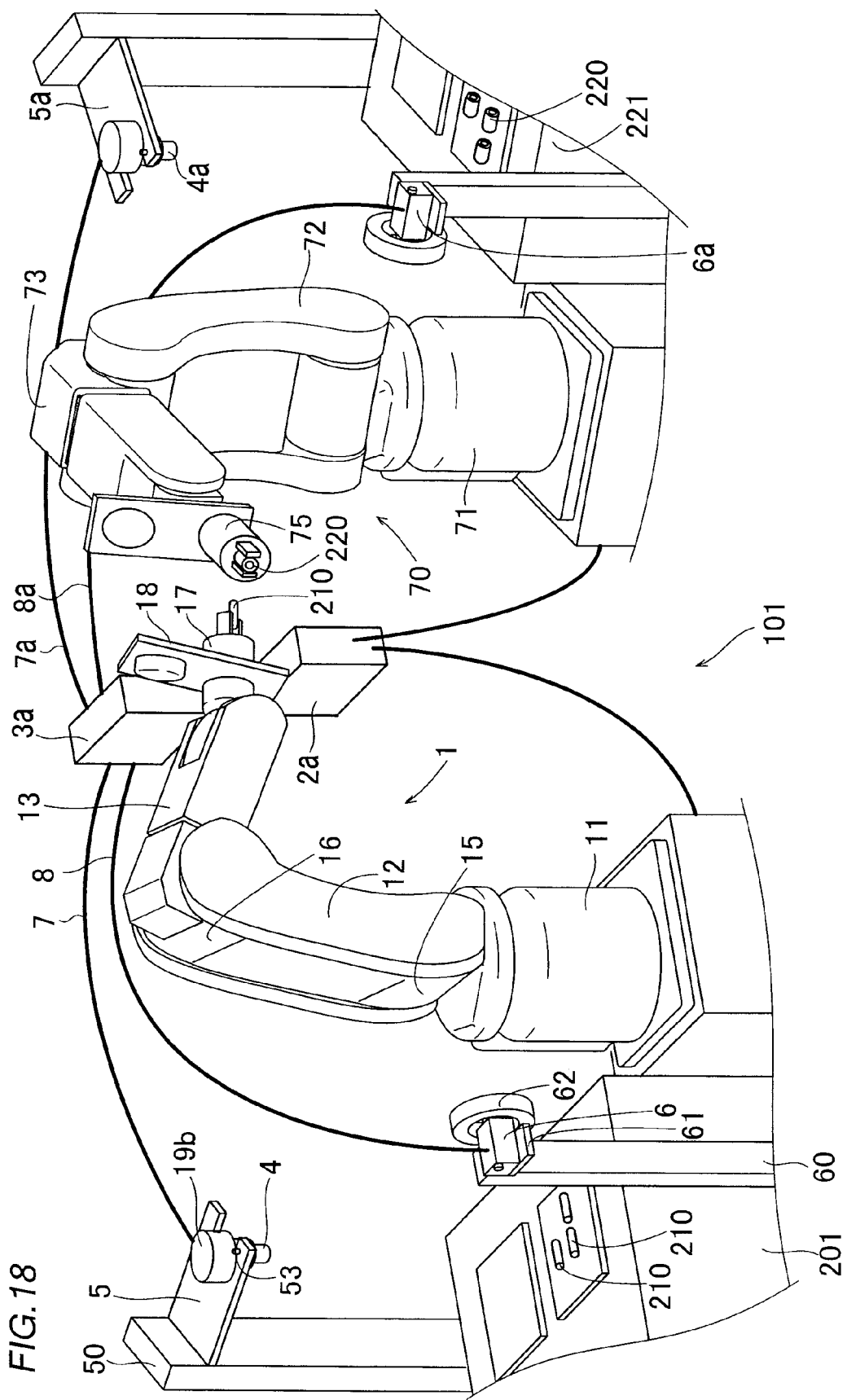
FIG. 18 is a diagram showing an assembly operation of the robot system according to the second embodiment.

Then, the work 210 that is being grasped by the hand portion 17 of the robot 1 and the work 220 that is being grasped by the hand portion 75 of the robot 70 are combined on the basis of the state of the work 210 that is being grasped by the hand portion 17 of the robot 1, having been examined by the examination camera 6 and the state of the work 220 that is being grasped by the hand portion 75 of the robot 70, having been examined by the examination camera 6a, as shown in FIG. 18. Specifically, the work 210 (shaft) that is being grasped by the hand portion 17 of the robot 1 is inserted into the work 220 (shaft bearing) that is being grasped by the hand portion 75 of the robot 70.

According to the second embodiment, as hereinabove described, the control portion 21a examines the state of the work 210 that is being grasped by the hand portion 17 on the basis of the images of the work 210 taken by the examination camera 6, and examines the state of the work 220 that is being grasped by the hand portion 75 on the basis of the images of the work 220 taken by the examination camera 6a. Thus, the state of the work 210 that is being grasped by the hand portion 17 of the robot 1 and the state of the work 220 that is being grasped by the hand portion 75 of the robot 70 are confirmed, and hence operations of the robot 1 and the robot 70 can be controlled on the basis of the states of the work 210 that is being grasped by the hand portion 17 and the work 220 that is being grasped by the hand portion 75.

According to the second embodiment, as hereinabove described, the control portion 21a controls the robot 1 and the robot 70 to combine the work 210 and the work 220 on the basis of the state of the work 210 that is being grasped by the hand portion 17 of the robot 1 (the position where the work 210 is being grasped, the posture of the work 210, etc.), having examined by the examination camera 6 and the state of the work 220 that is being grasped by the hand portion 75 of the robot 70 (the position where the work 220 is being grasped, the posture of the work 220, etc.), having examined by the examination camera 6a. Thus, the work 210 and the work 220 can be reliably combined.

Although the disclosure has been described and illustrated in detail, it is clearly understood that the same is by way of illustration and example only and is not to be taken by way of limitation, the spirit and scope of the present invention being limited only by the terms of the appended claims.

For example, while the wrist joint is rotated about the E-axis (see FIG. 12) and the F-axis (see FIGS. 13 and 14) to change the posture of the work multiple times in each of the aforementioned first and second embodiments, the present invention is not restricted to this. The robot may alternatively be rotated about axes other than the E-axis and the F-axis to change the posture of the work multiple times.

While the position confirmation camera is detached and the works are examined, after the image of all the works is taken and the positions of all the works are confirmed by the position confirmation camera in each of the aforementioned first and second embodiments, the present invention is not restricted to this. Alternatively, the position confirmation camera may be detached and the works (or the work) may be examined, after an image of some (or an image of one) of all the works is taken and the positions of some (or the position of one) of all the works are confirmed, for example.

While the works are examined after the position confirmation camera is detached in each of the aforementioned first and second embodiments, the present invention is not restricted to this. The position confirmation camera may alternatively be detached after the works are examined, for example.

Figure 19:
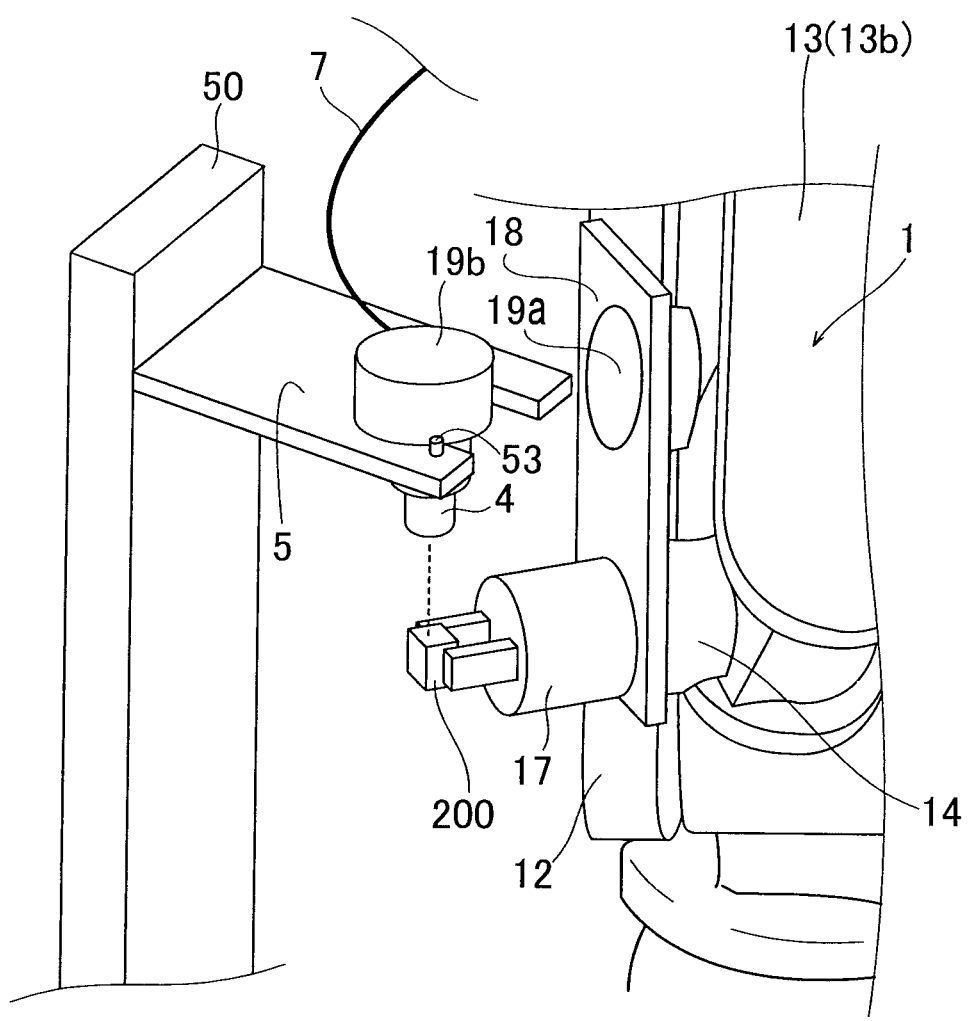
FIG. 19 is a diagram showing a state of examining (taking an image of) a work by a position confirmation camera of a robot system according to a modification of each of the first and second embodiments.

While the position confirmation camera and the examination camera are separately provided in each of the aforementioned first and second embodiments, the present invention is not restricted to this. For example, the robot system may alternatively be so formed as to take an image of the works and confirm the positions of the works by the position confirmation camera, detach the position confirmation camera from the arm of the robot and fixedly place the same on the placement portion, and thereafter take images of the work and examine the work by the position confirmation camera having been placed on the placement portion, as in a modification shown in FIG. 19. Thus, the position confirmation camera can also serve as the examination camera, and hence the structure of the robot system can be simplified.

While the robot system is so formed as to examine whether or not the works are conforming articles in the aforementioned first embodiment, and the robot system is so formed as to examine the states of the works that are being grasped by the robots in the aforementioned second embodiment, the present invention is not restricted to this. The robot system may alternatively be so formed as to examine both whether or not the works are conforming articles and the state(s) of the works that are being grasped by the robot(s), for example.

While the robot system is so formed as to examine both the state of the work 210 that is being grasped by the robot 1 and the state of the work 220 that is being grasped by the robot 70 in the aforementioned second embodiment, the present invention is not restricted to this. The robot system may alternatively be so formed as to examine either the state of the work 210 that is being grasped by the robot 1 or the state of the work 220 that is being grasped by the robot 70.

While the robot system 101 has the two robots 1 and 70 in the aforementioned second embodiment, the present invention is not restricted to this. The robot system may alternatively have a dual-arm robot and examine a state of a work that is being grasped by one robot arm (or states of works that are being grasped by both robot arms) of the dual-arm robot, for example.

What is claimed is:

1. A robot system comprising:
   a robot including a robot arm mounted with a grasping portion to grasp an object to be grasped;
   a first imaging portion to examine the object in a state that the object is grasped by the grasping portion, disposed separately from the robot arm;
   a control portion configured to operate the robot and the first imaging portion; and
   a second imaging portion mounted to the robot arm,
   wherein the control portion is configured to operate the robot to grasp the object to be grasped by the grasping portion, and operate the first imaging portion to examine the object multiple times while operating the robot arm to change a posture of the object, and
   wherein the control portion is configured to detach the second imaging portion after taking an image of the object to be grasped and confirming a position of the object to be grasped by the second imaging portion, control the robot to grasp the object to be grasped by the grasping portion, and control the first imaging portion to examine the object grasped by the grasping portion while driving the robot arm to change the posture of the object grasped by the grasping portion multiple times.

2. The robot system according to claim 1, wherein
   the robot includes a vertical articulated robot capable of being driven about multiple axes, and
   the control portion is configured to operate the robot to grasp the object by the grasping portion, and operate the first imaging portion to examine the object multiple times while driving the robot arm about the multiple axes to change the posture of the object.

3. The robot system according to claim 1, wherein
   the control portion is configured to operate the first imaging portion to take an image of the object and examine the object each time when the robot arm is operated to change the posture of the object multiple times.

4. The robot system according to claim 1, wherein
the control portion is configured to examine whether or not the object to be grasped is a conforming article on the basis of an image of the object to be grasped taken by the first imaging portion.

5. The robot system according to claim 1, wherein
the control portion is configured to examine a state of the object to be grasped that is being grasped by the grasping portion on the basis of an image of the object to be grasped taken by the first imaging portion.

6. The robot system according to claim 5, wherein
the control portion is configured to examine at least either a position of the object to be grasped that is being grasped by the grasping portion or a posture of the object to be grasped that is being grasped by the grasping portion on the basis of the image of the object to be grasped taken by the first imaging portion.

7. The robot system according to claim 1, further comprising a lighting portion to emit light to the object to be grasped, arranged near the first imaging portion set separately from the robot.

8. The robot system according to claim 1, wherein
the first imaging portion is arranged near a path to move the object to be grasped that is being grasped by the grasping portion to a prescribed processing position.

9. The robot system according to claim 1, further comprising an image processor to process an image taken by the first imaging portion, wherein
the control portion is configured to examine the object to be grasped on the basis of an image processed by the image processor.

10. The robot system according to claim 1, wherein
the control portion is configured to control the robot to grasp the object to be grasped by the grasping portion, and control the first imaging portion to examine the object to be grasped while driving the robot arm to change the posture of the object to be grasped multiple times before moving the object to be grasped that is being grasped by the grasping portion into a processing machine.

11. The robot system according to claim 1, further comprising a second imaging portion mounted to the robot arm, wherein
the first imaging portion to examine the object to be grasped that is being grasped by the grasping portion and the second imaging portion mounted to the robot arm are constituted by a same imaging portion, and
the control portion is configured to detach the imaging portion and disposed the imaging portion after taking an image of the object to be grasped and confirming a position of the object to be grasped by the imaging portion mounted to the robot arm, control the robot to grasp the object to be grasped by the grasping portion, and control the imaging portion to examine the object to be grasped while driving the robot arm to change the posture of the object to be grasped multiple times.

12. The robot system according to claim 11, further comprising a placement portion to place the imaging portion detached from the robot arm, wherein
the control portion is configured to detach the imaging portion and fixedly place the imaging portion on the placement portion after taking the image of the object to be grasped and confirming the position of the object to be grasped by the imaging portion mounted to the robot arm, control the robot to grasp the object to be grasped by the grasping portion, and control the imaging portion having been placed on the placement portion to examine the object to be grasped while driving the robot arm to change the posture of the object to be grasped multiple times.

13. The robot system according to claim 1, wherein
the robot includes a pair of a first robot and a second robot each having a robot arm,
the object to be grasped includes a first object to be grasped by a grasping portion of the first robot and a second object to be grasped by a grasping portion of the second robot, and
the control portion is configured to control the first imaging portion to examine a state of the first object to be grasped that is being grasped by the grasping portion of the first robot while driving the robot arm of the first robot to change a posture of the first object to be grasped multiple times after grasping the first object to be grasped by the grasping portion of the first robot, and combine the first object to be grasped that is being grasped by the grasping portion of the first robot and the second object to be grasped that is being grasped by the grasping portion of the second robot on the basis of the state of the first object to be grasped that is being grasped by the grasping portion of the first robot, having been examined by the first imaging portion.

14. A processed object manufacturing method comprising:
taking an image of an object to be grasped by an imaging portion mounted to a robot arm;
detaching the imaging portion from the robot arm after taking the image of the object to be grasped;
grasping an object to be grasped by a grasping portion mounted to the robot arm;
examining the object multiple times in a state that the object is grasped by the grasping portion by an additional imaging portion disposed separately from the robot arm while operating the robot arm to change a posture of the object that is being grasped by the grasping portion;
putting the object to a processing machine; and
processing the object by the processing machine.

15. An examination method employing a robot system, comprising:
grasping an object to be grasped by a grasping portion mounted to a robot arm; and
examining the object in a state that the object is grasped by the grasping portion by a first imaging portion disposed separately from the robot arm while driving the robot arm to change a posture of the object grasped by the grasping portion multiple times, wherein
when the object to be grasped is examined by the first imaging portion, a second imaging portion mounted to the robot arm is detached after an image of the object to be grasped is taken and a position of the object to be grasped is confirmed by the second imaging portion, the object to be grasped is grasped by the grasping portion, and the object grasped by the grasping portion is examined by the first imaging portion while the robot arm is driven to change the posture of the object grasped by the grasping portion multiple times.

16. The examination method employing a robot system according to claim 15, wherein
the robot arm includes a robot arm of a vertical articulated robot capable of being driven about multiple axes, and
when the object to be grasped is examined by the first imaging portion, the object to be grasped is grasped by the grasping portion, and the object to be grasped is examined by the first imaging portion while the robot arm is driven about the multiple axes to change the posture of the object to be grasped multiple times.

17. The examination method employing a robot system according to claim 15, wherein
when the object to be grasped is examined by the first imaging portion, whether or not the object to be grasped is a conforming article is examined on the basis of an image of the object to be grasped taken by the first imaging portion.

18. The examination method employing a robot system according to claim 15, further comprising a lighting portion to emit light to the object to be grasped, arranged near the first imaging portion set separately from the robot arm.

* * * * *